(12) United States Patent
Rajabali et al.

(10) Patent No.: US 8,216,658 B2
(45) Date of Patent: Jul. 10, 2012

(54) LAMINATED PANEL WITH DISCONTINUOUS INTERNAL LAYER

(75) Inventors: Abdoel Faziel Rajabali, Alphen A/D Rijn (NL); Willem Jan Nicolaas Ter Steeg, Pulheim (DE)

(73) Assignee: Fokker Aerostructures B.V., LB Papendrecht (NL)

( * ) Notice: Subject to any disclaimer, the term of this patent is extended or adjusted under 35 U.S.C. 154(b) by 0 days.

(21) Appl. No.: 10/504,381

(22) PCT Filed: Feb. 13, 2003

(86) PCT No.: PCT/NL03/00105
§ 371 (c)(1),
(2), (4) Date: Aug. 11, 2004

(87) PCT Pub. No.: WO03/068494
PCT Pub. Date: Aug. 21, 2003

(65) Prior Publication Data
US 2005/0089704 A1    Apr. 28, 2005

(30) Foreign Application Priority Data

Feb. 13, 2002 (NL) .................................... 1019957

(51) Int. Cl.
*B21C 1/00* (2006.01)
(52) U.S. Cl. ............ 428/77; 29/889.7; 109/78; 109/80; 109/82; 416/230; 428/55; 428/67; 428/131; 428/315.9; 428/544; 428/545; 428/548; 428/608; 428/615; 442/232; 442/233; 442/234; 442/235; 442/236; 442/238; 442/378

(58) Field of Classification Search .................. 428/77, 428/55, 131, 195, 545, 548, 615, 315.9, 67, 428/544, 608; 109/80, 78, 82; 416/230, 416/229; 29/889.7; 442/232, 233, 234, 235, 442/236, 238, 378
See application file for complete search history.

(56) References Cited

U.S. PATENT DOCUMENTS

| 5,417,385 A | 5/1995 | Arnold et al. ..................... 244/1 |
| 5,755,558 A * | 5/1998 | Reinfelder et al. ........... 416/230 |
| 6,114,050 A * | 9/2000 | Westre et al. ................. 428/608 |

FOREIGN PATENT DOCUMENTS
NL    1 015 141 C    11/2001
WO   WO 98 53989 A    12/1998

OTHER PUBLICATIONS
International Search Report of May 30, 2003.
* cited by examiner

*Primary Examiner* — Brent O'Hern
(74) *Attorney, Agent, or Firm* — Greenberg Traurig, LLP

(57) ABSTRACT

In a laminate, comprising at least one series of metal layers and fiber-reinforced plastic layers which are attached to one another, at least two different series are provided, these series including a transition, and at the location of the transition at least one of the internal layers is discontinuous and all the other layers are continuous.

15 Claims, 3 Drawing Sheets

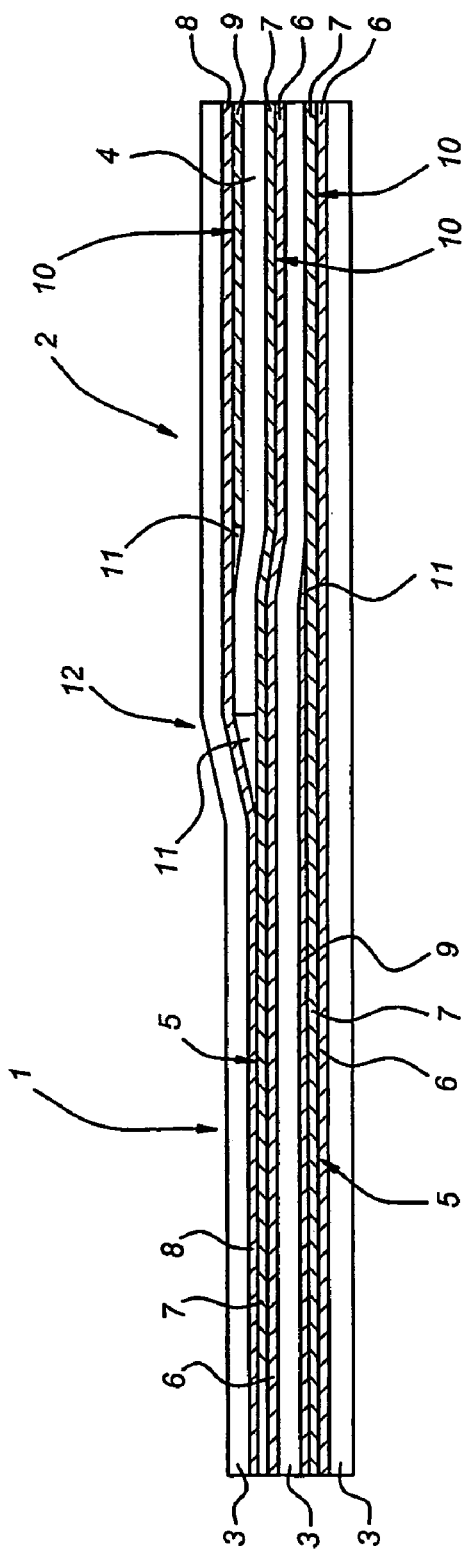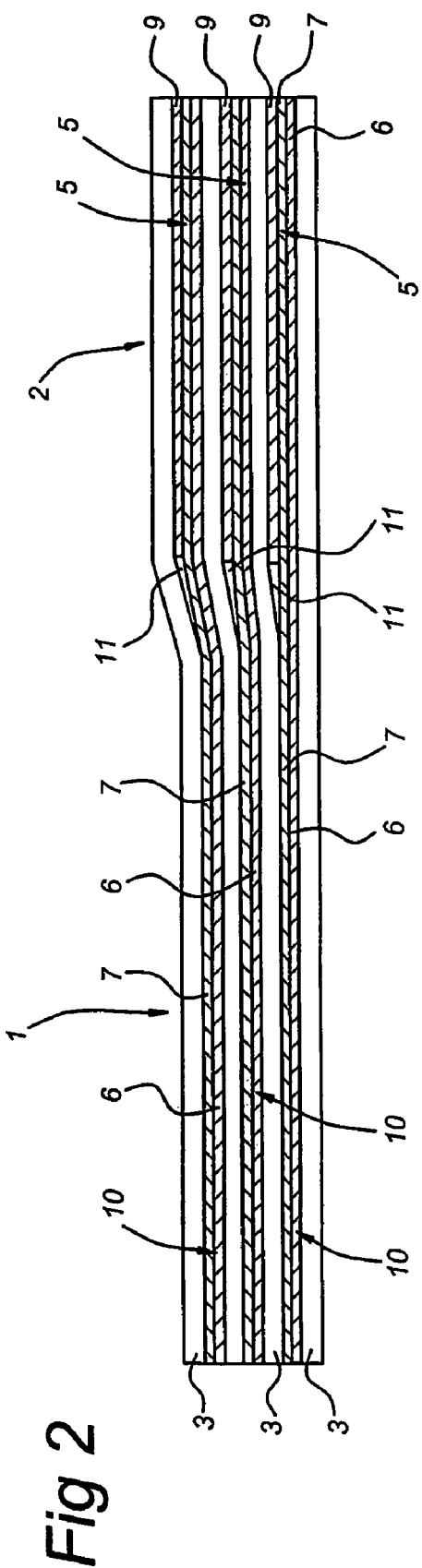
Fig 1
Fig 2

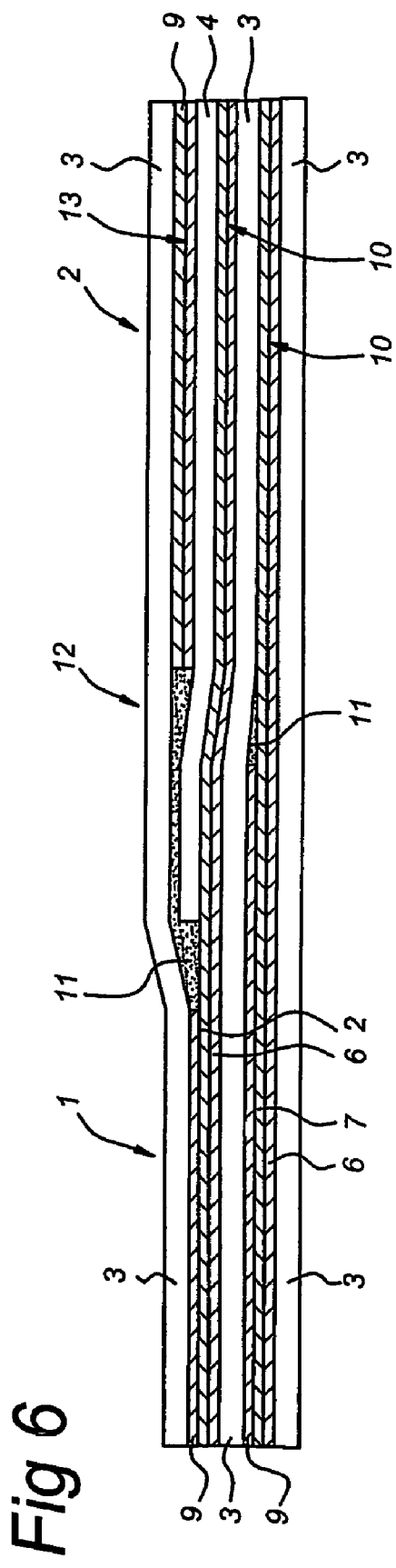
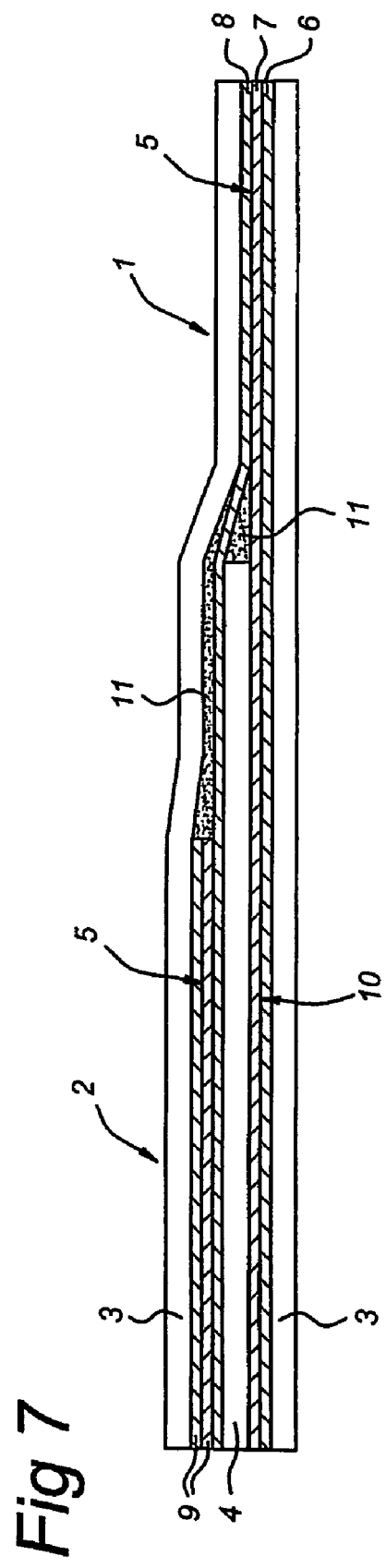

LAMINATED PANEL WITH DISCONTINUOUS INTERNAL LAYER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates to a laminate, for example designed as a laminated panel, comprising at least one series of metal layers and plastic layers, which comprise fibers and are impregnated with a plastic material, attached to one another.

(2) Description of Related Art Including Information Disclosed Under 37 CFR 1.97 and 1.98

A laminate of this type is known from WO-A-9853989 and is used, for example, in cladding panels for aircraft. In that case, the metal layers usually consist of an aluminum alloy. The plastic layers may, for example, be composed of plastic fibers with a high modulus of elasticity and consist, for example, of aramid. The plastic material with which the fibers are impregnated may be either a thermoplastic or a thermoset.

The advantage of a laminated panel is that the strength and rigidity properties can be locally adjusted. For example, at the locations where relatively high loads occur, for example around door openings, additional layers can be included in the laminate. In this way, by means of suitable selection of the dimensions of the layers, it is possible to obtain a gradual transition between the various regions in the panel without stress concentrations being otherwise introduced.

Panels of this type were joined to one another by means of a seam or splice, in which the edges or panels of this type overlap one another. An overlap of this type, which is disclosed by NL-C 1015141, however, forms a sudden, external interruption to the continuous nature of the aircraft cladding composed of panels of this type. WO-A-9853989 has also disclosed a connection between the various layers in the panels in which a separate connecting strip (doubler) is used. A connecting strip of this type also disturbs the externally continuous character of the panels. Interruptions of this type are undesirable both for reasons of aerodynamics and of strength and rigidity.

In addition, it is known to produce the laminate as a whole in various types, with more or fewer layers, in order to create panels which are intended for zones of an aircraft, for example, which are subjected to higher or lower levels of load. For example, there are panels with four metal layers, between each of which there are sets having two plastic layers (type Glare® 3). In yet another type, three metal layers are used in combination with sets of three plastic layers (Glare® 4).

BRIEF SUMMARY OF THE INVENTION

Therefore, it is an object of the invention, in a laminate, to provide a smooth transition between series of different composition. This object is achieved by the fact that at least two different series are provided, there series including a transition, and in that at the location of the transition at least one of the internal layers is discontinuous and all the other layers are continuous. That is, a continuous layer runs all the way through the transition without interruption and a discontinuous layer ends at the location of a transition. At the location of the transition between two series with different series of layers, there may be a sudden change in the thickness of the laminate, but this need not necessarily be the case.

If one or more layers are allowed to end in the interior of the laminate, it is possible to obtain a very gradual transition, in such a manner that stress concentrations and undesirable aerodynamic effects are avoided.

The laminate according to the invention can be designed in numerous different ways. For example, there may be in each case one set of at least two fiber-reinforced plastic layers between two adjacent metal layers, in which case the set is split at the end of a discontinuous metal layer, in such a manner that its plastic layers are located on either side of the discontinuous metal layer. Furthermore, at least one of the sets of fiber-reinforced plastic layers may include a discontinuous plastic layer.

The continuous nature of the majority of the metal layers and the fiber-reinforced plastic layers leads to the transition in the laminate being very gradual.

According to a preferred embodiment, on either side of the discontinuous metal layer there may be sets which have a different number of fiber-reinforced plastic layers from the sets in the region without a discontinuous metal layer. As an example, one series may comprise three metal layers, between each of which there is a set of three fiber-reinforced plastic layers, and another series may comprise four metal layers, of which three layers are continuous from the first series and of which an intermediate metal layer is discontinuous, between each of which four metal layers there are sets comprising two fiber-reinforced plastic layers, of which the sets of plastic layers on either side of the discontinuous metal layer are formed by a discontinuous plastic layer and three plastic layers, which have continued from the first series, of a first set of three plastic layers, and the second set of three plastic layers has two plastic layers which continue into the other series and one discontinuous plastic layer which is not continued into the other series. The result is a transition between laminates of the Glare® 3 and Glare® 4 types.

According to a further variant, there may be four metal layers, between each of which two plastic layers extend in one series, while in another series there are also discontinuous plastic layers, so as to form sets of three plastic layers. This variant too forms a transition between the Glare® 3 and the Glare® 4 types.

The invention will now be explained in more detail with reference to the laminates illustrated in FIGS. 1-7.

BRIEF DESCRIPTION OF THE SEVERAL VIEW OF THE DRAWINGS

FIG. 1 is an cross-sectional view of a laminate according to the teachings of the invention;

FIG. 2 is a cross-sectional view of another embodiment of a laminate according to the teachings of the invention;

FIGS. 4 through 7 are still further cross-sectional views of variations of a laminate in accordance with the teachings of the invention.

DETAILED DESCRIPTION OF THE INVENTION

Figure 3:
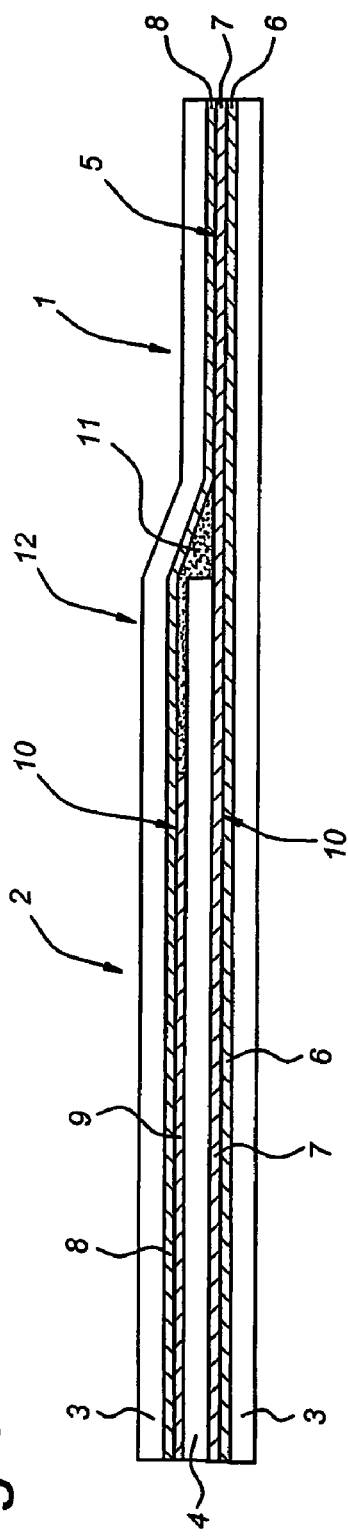
FIG. 3 is a cross-sectional view of still another embodiment of a laminate according to the teachings of the invention.

FIG. 1 shows a laminate according to the invention, which laminate comprises a first series 1 and a second series 2, which series 1, 2 include a transition region 12. The first series 1 comprises three metal layers 3 which are continued into the second series 2. Moreover, this second series 2 includes a discontinuous metal layer 4, which does not continue into the first series 1.

In the first series 1, two sets 5 each comprising three fiber-reinforced plastic layers 6, 7 and 8 are accommodated between the three metal layers 3. The top plastic layer 8 of the top set 5 runs over the top of the discontinuous metal layer 4, while the other two plastic layers 6, 7 of the top set 5 run underneath the discontinuous metal layer 4. A discontinuous plastic layer 9 starts at a certain distance from the edge of the discontinuous metal layer 4, in such a manner that the region between the top continuous metal layer 3 and the discontinuous metal layer 4 is substantially filled by a set 10 comprising two plastic layers 8, 9.

Between the discontinuous metal layer 4 and the continuous metal layer 3 located directly below it there is also a set 10 of two fiber-reinforced plastic layers 6, 7, both of which are continuous. The same is true of the bottom two continuous metal layers 3, which in the series 2 likewise enclose a set 10 of two discontinuous plastic layers 6, 7. The top plastic layer 9 which, in the first series 1, together with these plastic layers 6, 7 form the bottom set 5, is discontinuous and does not carry on into the second series 2.

These layers are attached to one another by means of a bonding agent, some of which can be seen at 11 in the transitions which have been defined between the discontinuous layers 4 and 9.

The series 1 is a laminate of the so-called Glare® 4 type, and the series 2 is a laminate of the so-called Glare® 3 type. This results in a very gradual transition between these two types, without stress concentrations or aerodynamically undesirable surfaces being formed.

The variant illustrated in FIG. 2 shows a laminate with four continuous metal layers 3, which in the series 1 are separated by sets 10 each comprising two fiber-reinforced plastic layers 6, 7. These plastic layers 6, 7 run continuously into the series 2, where they form part of the sets 5 comprising a total of three plastic layers. In addition to the continuous layers 6, 7, the sets 5 also include discontinuous plastic layers 9 in such a manner than each set 5 comprises three plastic layers.

Once again, bonding agent 11, by means of which the layers are glued together, can be seen at the location of the transitions between the discontinuous plastic layers. This laminate too forms a transition between the Glare® 3 type and the Glare® 4 type.

A further transition between a laminate of the Glare® 3 type and the Glare® 4 type is shown in FIG. 3, cf. the series 2 and 1 in this figure. The discontinuous fiber-reinforced plastic layer 9 does not run all the way along the discontinuous metal layer 4. The region above the metal layer 4 where the discontinuous plastic layer 9 is absent is filled with the bonding agent 11. The plastic layers 6 to 9 themselves comprise fiber layers which are impregnated with a plastic bonding agent.

Figure 4:
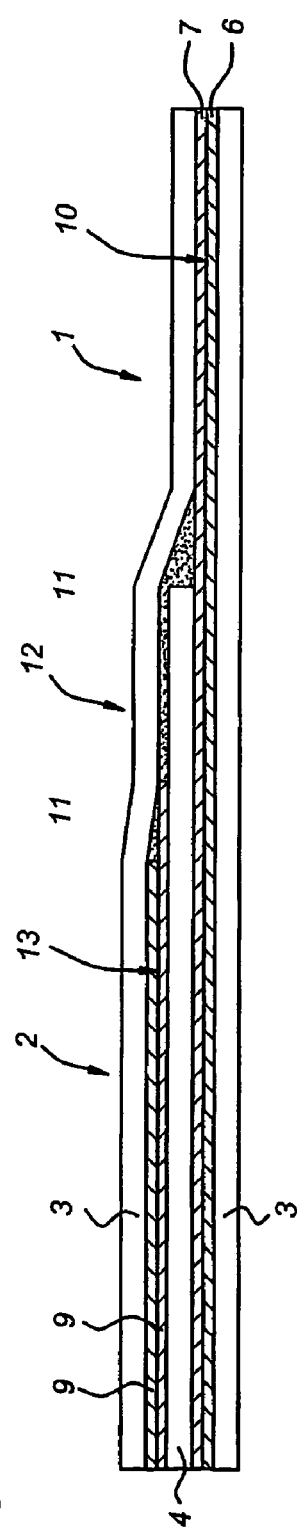

In the embodiment shown in FIG. 4, the layers 9, which are located in the series 2, of the set 13 are both discontinuous. The spaces which remain between the top metal layer 3 and the discontinuous metal layer 4 are filled with the bonding agent 11.

The continuous fiber-reinforced plastic layers 6, 7 continue onward between the bottom metal layer 3 and the discontinuous metal layer 4 or the following section of the top metal layer 3.

Figure 5:
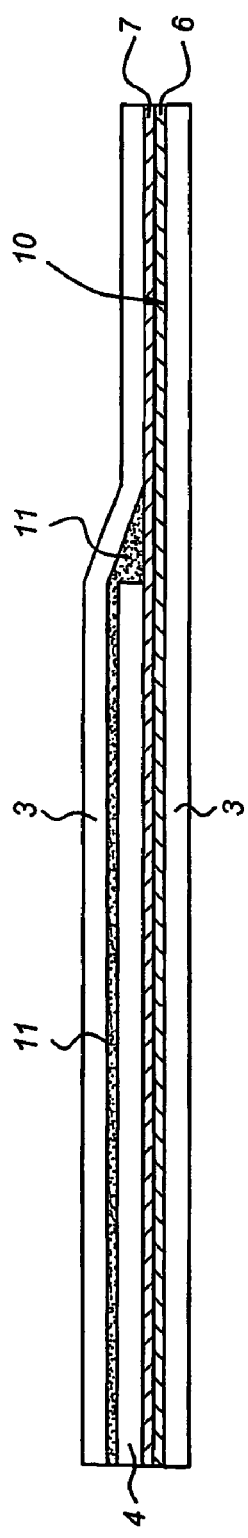

In the variant shown in FIG. 5, there is a plastic layer which consists entirely of the bonding agent 11, without any fiber reinforcement, located between the top metal layer 3 and the discontinuous middle metal layer 4. Between the bottom metal layer 3 and the discontinuous metal layer 4 or the adjoining part of the top metal layer 3 there is the set 10 comprising the two continuous plastic layers 6, 7 consisting of a fiber material which is impregnated with a plastic bonding agent.

The variant illustrated in FIG. 6 shows a further transition between laminate of the Glare® 4 type in series 1 and laminate of the Glare® 3 type in series 2. The set 13 comprising the two discontinuous fiber-reinforced plastic layers 9 between the top metal layer 3 and the discontinuous metal layer 4 ends at the transition 12, where the space between the corresponding metal layers is filled by the bonding agent 11.

The sets 10 comprising the continuous fiber-reinforced plastic layers 6, 7 are continuous, while the series 1 also includes the discontinuous fiber-reinforced plastic layers 9.

In the variant shown in FIG. 7, a set 5 comprising three continuous fiber-reinforced plastic layers 6, 7, 8 is provided in the series 1. A set 10 comprising the two continuous plastic layers 10 and a set 5 comprising the continuous plastic layer 8 and the discontinuous plastic layers 9 are provided in the series 2. The open spaces between the plastic bonding layers and the metal layers are filled with the bonding agent 11.

As shown in the figures, in each case one of the outer metal layers may be straight in cross section, while the other outer metal layer has a step or change in thickness. Furthermore, the corresponding laminate may, for example, be curved with respect to an axis of curvature parallel to this cross section and/or may be straight in the direction perpendicular to the plane of the cross section.

All kinds of different products can be selected for the metals and plastics. Examples of suitable metals are aluminum alloys, steel alloys, titanium alloys, copper alloys, magnesium alloys. In particular, mention may be made of aluminum-copper alloys (AA 2000), aluminum manganese alloys (AA 3000), aluminum-magnesium alloy (AA 5000), aluminum-zinc alloys (AA 7000) and aluminum-magnesium-silicon alloys (AA 6000).

The aluminum-copper alloy (AA 2224), the aluminum-zinc alloy (AA 7075) and the aluminum-magnesium-silicon alloy (AA 6013) are particularly preferred. The same is true of AA 2X24-23 and AA 7X75-26. If a high resistance to erosion is desired, an AA 50525 alloy may be included in the laminate.

Examples of suitable thermosets are epoxy resins, unsaturated polyesters, vinyl esters and phenolic esters. Examples of suitable thermoplastics are polyarylates (PAR), polysulfones (PSO), polyether sulfones (PES), polyetherimides (PEI) or polyphenylene ethers (PEE), polyphenylene sulfide (PPS), polyamide-4,6, polyketone sulfide (PKS), polyether ketones (PEK), polyether ether ketone (PEKK) and polyether ketone ketone (PEKK).

The bonding plastic layer may be provided with a reinforcement in the form of continuous fibers, for example as is the case in the abovementioned materials Glare® and ARALL®. It is preferable to use S-2 glass or R-glass fibers, which each comprise approximately 58-69% by weight of $SiO_2$, 18-29% by weight of $Al_2O_3$ and 7-19% by weight of MgO. E-glass fibers, comprising approximately 55% by weight of $SiO_2$, 15% by weight of $Al_2O_3$, 19% by weight of CaO, 7% by weight of $B_2O_3$ and 3% by weight of MgO, are also suitable. A suitable aramid fiber is produced from polyparaphenylene terephthalamide.

In the embodiment as seen in FIG. 1, a laminate is provided. The laminate comprises a first series of continuous metal layers and two sets of three continuous fibre-reinforced continuous plastic layers between and directly bonded with two adjacent metal layers, and a second series of the continuous metal layers and three sets of two continuous fibre-reinforced plastic layers between and directly bonded with two adjacent metal layers, a transition between the first series and the second series with the continuous metal layers and the continuous fiber-reinforced layers continuing from the first series to the second series through the transition, and the transition including at least one fibre-reinforced plastic layer that is discontinuous at the transition and does not extend through the transition.

In yet another embodiment as seen in FIG. 2, a laminate is provided. The laminate comprises a first series including two continuous metal layers defining the outer surfaces of the laminate, and three sets of two fibre-reinforced continuous plastic layers between the surfaces and directly bonded with two adjacent metal layers, a second series including the two continuous metal layers defining the outer surfaces of the laminate, and three sets of three fibre-reinforced continuous plastic layers between the surfaces and directly bonded with two adjacent metal layers, a transition region between the first series and the second series, wherein the metal layers of the first and second series defining the outer surfaces of the laminate are connected with each other continuously through the transition.

In yet another embodiment as seen in FIG. 3, a laminate is provided. The laminate comprises a first series including two continuous metal layers defining the outer surfaces of the laminate, and three fibre-reinforced continuous plastic layers between the surfaces and directly bonded with two adjacent metal layers, a second series including two continuous metal layers defining the outer surfaces of the laminate, and two sets of two fibre-reinforced continuous plastic layers between the surfaces and directly bonded with two adjacent metal layers, a transition region between the first series and the second series, wherein the metal layers of the first and second series defining the outer surfaces of the laminate are connected with each other continuously through the transition.

In yet another embodiment as seen in FIG. 4, a laminate is provided. The laminate comprises a first series including two continuous metal layers defining the outer surfaces of the laminate, and two fibre-reinforced continuous plastic layers between the surfaces and directly bonded with two adjacent metal layers, a second series including two continuous metal layers defining the outer surfaces of the laminate, and two sets of two fibre-reinforced continuous plastic layers between the surfaces and directly bonded with two adjacent metal layers, a transition region between the first series and the second series, wherein the metal layers of the first and second series defining the outer surfaces of the laminate are connected with each other continuously through the transition.

In another aspect of at least one embodiment of the present invention, as seen in FIG. 6, at least one of the fiber-reinforced plastic layers is discontinuous and does not extend through the transition.

The invention claimed is:

1. A laminate, comprising a first series of continuous metal layers and at least one set of at least two continuous fibre-reinforced plastic layers between and directly bonded with two adjacent metal layers, and a second series of the continuous metal layers and at least one set of the at least two continuous fibre-reinforced plastic layers between and directly bonded with two adjacent metal layers, a transition between the first series and the second series with the continuous metal layers and the continuous fiber-reinforced layers continuing from the first series to the second series through the transition, and the transition including at least one fibre-reinforced plastic layer that is discontinuous at the transition and does not extend through the transition, said continuous layers including outer (metal) layers defining the outer surfaces of the laminate, all of said continuous layers running all the way through said transition without interruption and all of said discontinuous layers ending at the location of said transition.

2. The laminate as claimed in claim 1, wherein the second series comprises at least one further discontinuous layer, said at least one further discontinuous layer not extending past the transition.

3. The laminate as claimed in claim 1, in which one series has a different number of layers from another series.

4. The laminate as claimed in claim 3, in which at least one of the metal layers is discontinuous and does not extend past the transition.

5. The laminate as claimed in claim 4, in which there is at least one first set of at least two plastic layers between two metal layers, and the first set is split at the end of a discontinuous metal layer, in such a manner that the at least one of the plastic layers of this first set is located in a plane on a side of the discontinuous metal layer and at least another of said plastic layers of this first set is located in a plane on the opposite side of the discontinuous metal layer.

6. The laminate as claimed in claim 5, in which a second set in the second series has an additional or fewer number of plastic layers from the first set in the first series without a discontinuous metal layer.

7. The laminate as claimed in claim 1, in which the first series comprises three metal layers, and a first set comprising three plastic layers located between each of the metal layers, and a second series that comprises four metal layers, of which three layers extend from the first region and of which an intermediate metal layer is discontinuous and does not extend past the transition into the first series, between each of the four metal layers there is a second set comprising two plastic layers, the second set defined by either:

the first set being split at the end of the discontinuous metal layer, in such a manner that two of the plastic layers of this first set are located in a plane on one side of the discontinuous metal layer;

the third plastic layer located in a plane on the other side of the discontinuous metal layer and a fiber-reinforced plastic layer that is discontinuous and does not extend past the transition into the first series; or the first set having a discontinuous plastic layer that does not extend past the transition into the second series.

8. The laminate as claimed in claim 1, in which at least one of the fiber-reinforced plastic layers is discontinuous and does not extend past the transition into the first series.

9. The laminate as claimed in claim 8, in which there are four metal layers, a first set of two plastic layers between each metal layer in the first series, and a second set of three plastic layers between each metal layer in the second series, the second set being defined by the two plastic layers extending from the first series to the second series and a discontinuous plastic layer that does not extend past the second series into the first series.

10. The laminate as claimed in claim 1, in which at least one layer comprises a bonding agent without fiber reinforcement.

11. The laminate as claimed in claim 1, in which at least one of the fibre-reinforced plastic layers is discontinuous at the transition and does not extend past the transition.

12. The laminate as claimed in claim 1 wherein the laminate is used in the construction of an aircraft.

13. A laminate, comprising:
   a first series including at least two continuous metal layers defining the outer surfaces of the laminate, and at least one set of at least two fibre-reinforced continuous plastic layers between the surfaces and directly bonded with two adjacent metal layers;
   a second series including the at least two continuous metal layers defining the outer surfaces of the laminate, and the at least one set of at least two fibre-reinforced continuous plastic layers between the surfaces and directly bonded with two adjacent metal layers;
   a transition region between the first series and the second series, wherein the metal layers of the first and second series defining the outer surfaces of the laminate are connected with each other continuously through the transition;
   wherein one of the first and second series comprises a total of 2 metal layers and the other series comprises a total of 3 metal layers, all of said continuous layers running all the way through said transition without interruption, wherein at least one of the fiber-reinforced plastic layers being discontinuous and does not extend through the transition.

14. A laminate, comprising:
   a first series including at least two continuous metal layers defining the outer surfaces of the laminate, and at least one set of at least two fibre-reinforced continuous plastic layers between the surfaces and directly bonded with two adjacent metal layers;
   a second series including the at least two continuous metal layers defining the outer surfaces of the laminate, and the at least one set of at least two fibre-reinforced continuous plastic layers between the surfaces and directly bonded with two adjacent metal layers;
   a transition region between the first series and the second series, wherein the metal layers of the first and second series defining the outer surfaces of the laminate are connected with each other continuously through the transition;
   wherein one of the first and second series comprises a total of 3 metal layers and the other series comprises a total of 4 metal layers, all of said continuous layers running all the way through said transition without interruption, at least one of the fiber-reinforced plastic layers being discontinuous and does not extend through the transition.

15. A laminate, comprising:
   a first series including at least two continuous metal layers defining the outer surfaces of the laminate, and at least one set of at least two fibre-reinforced continuous plastic layers between the surfaces and directly bonded with two adjacent metal layers;
   a second series including the at least two continuous metal layers defining the outer surfaces of the laminate, and the at least one set of at least two fibre-reinforced continuous plastic layers between the surfaces and directly bonded with two adjacent metal layers;
   a transition region between the first series and the second series, wherein the metal layers of the first and second series defining the outer surfaces of the laminate are connected with each other continuously through the transition;
   wherein one of the first and second series comprises a total of 4 metal layers and the other series comprises a total of 4 metal layers, all of said continuous layers running all the way through said transition without interruption, at least one of the fiber-reinforced plastic layers being discontinuous and does not extend through the transition.

* * * * *